(12) United States Patent
Kawagoe

(10) Patent No.: US 8,408,260 B2
(45) Date of Patent: Apr. 2, 2013

(54) PNEUMATIC TIRE WITH TREAD HAVING PROJECTIONS FOR PREVENTING STONE TRAPPING

(75) Inventor: Kenji Kawagoe, Tachikawa (JP)

(73) Assignee: Bridgestone Corporation, Tokyo (JP)

( * ) Notice: Subject to any disclaimer, the term of this patent is extended or adjusted under 35 U.S.C. 154(b) by 699 days.

(21) Appl. No.: 12/524,954

(22) PCT Filed: Dec. 21, 2007

(86) PCT No.: PCT/JP2007/074672
§ 371 (c)(1),
(2), (4) Date: Jul. 29, 2009

(87) PCT Pub. No.: WO2008/093481
PCT Pub. Date: Aug. 7, 2008

(65) Prior Publication Data
US 2010/0139827 A1 Jun. 10, 2010

(30) Foreign Application Priority Data
Jan. 30, 2007 (JP) .................. 2007-019741

(51) Int. Cl.
*B60C 11/04* (2006.01)
*B60C 11/13* (2006.01)
(52) U.S. Cl. ............... 152/209.19; 152/900; 152/DIG. 1
(58) Field of Classification Search ............. 152/209.19, 152/209.21, 209.24, 900, 901, DIG. 1
See application file for complete search history.

(56) References Cited

U.S. PATENT DOCUMENTS 3,664,402 A * 5/1972 Montagne ................ 152/209.24
4,345,632 A * 8/1982 Takigawa et al. ........ 152/209.19

FOREIGN PATENT DOCUMENTS

| JP | 59-172005 U | | 11/1984 |
| JP | 60-189608 A | | 9/1985 |
| JP | 60-189608 A | * | 9/1985 |
| JP | 62-194908 A | | 8/1987 |
| JP | 04-306105 A | * | 10/1992 |
| JP | 05-000606 A | | 1/1993 |
| JP | 10-151914 A | | 6/1998 |
| JP | 2001-030717 A | | 2/2001 |
| JP | 2004-034771 A | * | 2/2004 |
| JP | 2006-315475 A | * | 11/2006 |
| JP | 2006-315475 A | | 11/2006 |

OTHER PUBLICATIONS

Machine translation for Japan 2006-315475 (no date).*
Machine translation for Japan 2004-034771 (no date).*
International Search Report of PCT/JP2007/074672 dated Apr. 1, 2008.
Chinese Office Action issued in Application No. 200780050703.3 dated Feb. 2, 2012.
Chinese Office Action issued in Application No. 200780050703.3 dated Nov. 16, 2011.

* cited by examiner

*Primary Examiner* — Steven D Maki
(74) *Attorney, Agent, or Firm* — Sughrue Mion, PLLC

(57) ABSTRACT

The object of the present invention is to provide a pneumatic tire with an operation life elongated by a countermeasure for stone trapping. Projections 28 for preventing stone trapping are disposed on a groove bottom only of a flexion portion 24 of a center main groove 20 disposed on a tread portion 18 where the main groove bends in a zigzag manner, and an angle of a groove wall of a linear portion 26 connecting the adjacent bending portions with respect to a tread normal line direction is larger than an angle of a groove wall of the flexion portion 24 with respect to the tread normal line direction. This can suppress stone trapping at the same level as the conventional tire without providing a projection for preventing stone trapping on the linear portion 26. Therefore, the number of projections 28 for preventing stone trapping can be significantly reduces as compared to the conventional tire to remarkably decrease likelihood of appearing the projections 28 for preventing stone trapping on the tire surface while the tire is still usable.

7 Claims, 4 Drawing Sheets

Section 3-3

Section 4-4

Section 5-5

PNEUMATIC TIRE WITH TREAD HAVING PROJECTIONS FOR PREVENTING STONE TRAPPING

TECHNICAL FIELD

The present invention relates to a pneumatic tire with a countermeasure for stone trapping, and more particularly to a pneumatic tire suitable for a heavy load tire such as a truck and bus tire.

RELATED ART

A pneumatic tire tends to trap a stone in a circumferential groove (main groove) of a tread portion during a move on a road. A harmful effect such as damage to a groove portion or a belt is prone to occur due to the trapped stone, so a countermeasure for stone trapping is important.

As a countermeasure for stone trapping, Patent Document 1, for example, discloses a tire in which a number of projections for preventing stone trapping are arranged on a groove bottom of a center main groove extending along a tire equator plane to eject any trapped stones. This countermeasure, however, has a problem that a tire of which a part of the projections for preventing stone trapping appear on the surface of the tire due to a progress of wear is often judged as one having a completely worn tread portion, and thus the tire is discarded at an early stage although the tire is still usable.

Patent Document: JP 2001-30717 A

DISCLOSURE OF THE INVENTION

Problems to be Solved by the Invention

The present invention is based on the above-mentioned facts and its object is to provide a pneumatic tire with an operation life elongated by a countermeasure for stone trapping.

Means for Solving the Problem

The present inventor studied a structure in which no projections for preventing stone trapping appear on the tire surface as far as the tire is still in a usable condition. In this regard, the inventor focused attention on the following points:

1) A wider groove width and a shallower groove depth make a wear volume of a tire smaller to give a shorter operation life of the tire;

2) A larger angle of a groove wall (groove wall angle) with respect to a tread normal line direction makes a radius of curvature of a groove bottom face smaller to give more stress concentration, which often causes a crack;

3) The projections for preventing stone trapping are conventionally arranged over entire tire circumference, so that a user thinks that the tire is worn out to reach its end stage of the operation life when the wear has developed to the projections for preventing stone trapping:

4) In a rib groove extending along the tire circumference direction in a zigzag shape, bending portions where the groove bends in a zigzag manner often trap stones while straight portions seldom trap stones, and the center main groove trap stones more frequently than the shoulder main groove does; and 5) Therefore, even if the groove width, groove depth and groove angle are adjusted, stones are still trapped and besides, arranging projections for preventing stone trapping over entire tire circumference remains concern about the above-mentioned point 3).

As a result of keen examinations, the inventor found that the above-mentioned object can be solved by restricting areas to which the projections for preventing stone trapping are arranged to certain regions, and further conducted experiments to complete the present invention.

A non-limiting embodiment of the invention includes a pneumatic tire provided with a plurality of main grooves extending along a tire circumference direction in a zigzag manner on a tread portion, characterized in that projections for preventing stone trapping are disposed on a groove bottom only of a bending portion of at least a main groove closest to a tire equator plane where the main groove bends in a zigzag manner, and an angle of a groove wall of a main groove portion connecting the adjacent bending portions with respect to a tread normal line direction is larger than an angle of a groove wall of the bending portion with respect to the tread normal line direction.

The term "extending along a tire circumference direction in a zigzag manner" as used herein means that the groove extends along the tire circumferential direction while the groove portions inclined with respect to the tire circumferential direction alternate their incline directions one after another.

The main groove portion often has a straight shape but it is not limited to a straight shape and may conceptually include a groove portion having a curved shape without no bending part.

In this way, the angle of the groove wall of the above-mentioned main groove portion with respect to the tread normal direction is set larger than the angle of the groove wall of the bending portion with respect to the tread normal line. Therefore, it is possible to suppress stone trapping at the same level as the conventional tire without providing a projection for preventing stone trapping on the above-mentioned main groove portion to significantly reduce the number of projections for preventing stone trapping as compared to the conventional tire. Accordingly, there is remarkably decreased likelihood of appearing the projections for preventing stone trapping on the tire surface while the tire is still usable.

It is noted that stone trapping occurs in the main groove closer to the tire equator plane (center main groove) more often that in the main groove farther from the tire equator plane (shoulder main groove). It is, therefore, possible to reduce the arranged number of the projections for preventing stone trapping to the minimum by arranging the projection for preventing stone trapping only on the groove bottom at the bending portions of the main groove closest to the tire equator plane.

In a non-limiting embodiment of the invention, the projections for preventing stone trapping are disposed on a groove bottom only of a bending portion of at least a main groove closest to the tire equator plane where stone trapping often occurs. The bending portion where stress tends to concentrate has an angle of the groove wall with respect to the tread normal line direction not as large as that of the main groove portion, so that the radius of curvature of the groove bottom is not too small even if the groove width is not wide. Thus, a crack resistance (improbability of causing a crack) of the bending portion can be maintained at the same level as that of a conventional tire.

In this way, non-limiting embodiments of the invention can significantly reduce likelihood of appearance of the projection for preventing stone trapping on the tire surface during the tire is still in a usable condition while maintaining the crack resistance and stone-trapping resistance at the same levels as those of a conventional tire to thereby provide a pneumatic tire with a countermeasure for stone trapping and an elongated operation life.

The height of the projection for preventing stone trapping is preferably from 5% to 50% of the depth of the main groove from the viewpoint of suppressing stone trapping between the wall surface of the main groove and the projection for preventing stone trapping.

In a non-limiting embodiment of the invention, the angle of the groove wall of the main groove portion with respect to the tread normal line direction is within a range of 15 degrees to 20 degrees.

When the angle is less than 15 degrees, stones are often trapped. When the angle is more than 20 degrees, the groove width tends to be too large. In a non-limiting embodiment, it is possible to appropriately expand the groove width of the above-mentioned main groove portion to suppress the occurrence of stone trapping.

In a non-limiting embodiment of the invention, a ratio of a groove width W of the main groove portion on the tread surface to a groove depth h of the main groove portion (W/h) is within a range of 0.8 to 1.2.

When the ratio is less than 0.8, the groove tends to be too deep. When the ratio is more than 1.2, the groove width tends to be too large. With the non-limiting embodiments of the invention, it is possible to form the main groove portion in a shape of suppressing stone trapping.

In a non-limiting embodiment of the invention, the angle of the groove wall of the main groove portion with respect to the tread normal line direction varies within a range of 2.0 mm from the bending portion along the main groove portion.

This is because if the angle is varied within a range of more than 2.0 mm, the range of W/h with which stone trapping often occurs may be broadened. With the invention, it is possible to further suppress stone trapping.

Effect of the Invention

According to the present invention, a pneumatic tire with an operation life elongated by a countermeasure for stone trapping can be provided.

DESCRIPTION OF THE SYMBOLS

| | |
|---|---|
| 10 | pneumatic tire |
| 18 | tread portion |
| 20 | center main groove (main groove) |
| 22L | shoulder main groove (main groove) |
| 22R | shoulder main groove (main groove) |
| 24 | flexion portion (bending portion) |
| 26 | linear portion (main groove portion) |
| 28 | projection for preventing stone trapping |

-continued

DESCRIPTION OF THE SYMBOLS

| | |
|---|---|
| 26W | groove wall |
| 70 | center main groove |
| 76 | linear portion (main groove portion) |
| 80 | center main groove (main groove) |
| 86 | linear portion (main groove portion) |
| CL | tire equator plane |
| N | tread normal line direction |
| $\theta1$ | groove wall angle |
| $\theta2$ | groove wall angle |
| W | groove width |
| U | tire circumferential direction |

BEST MODE FOR CARRYING OUT THE INVENTION

Figure 1:
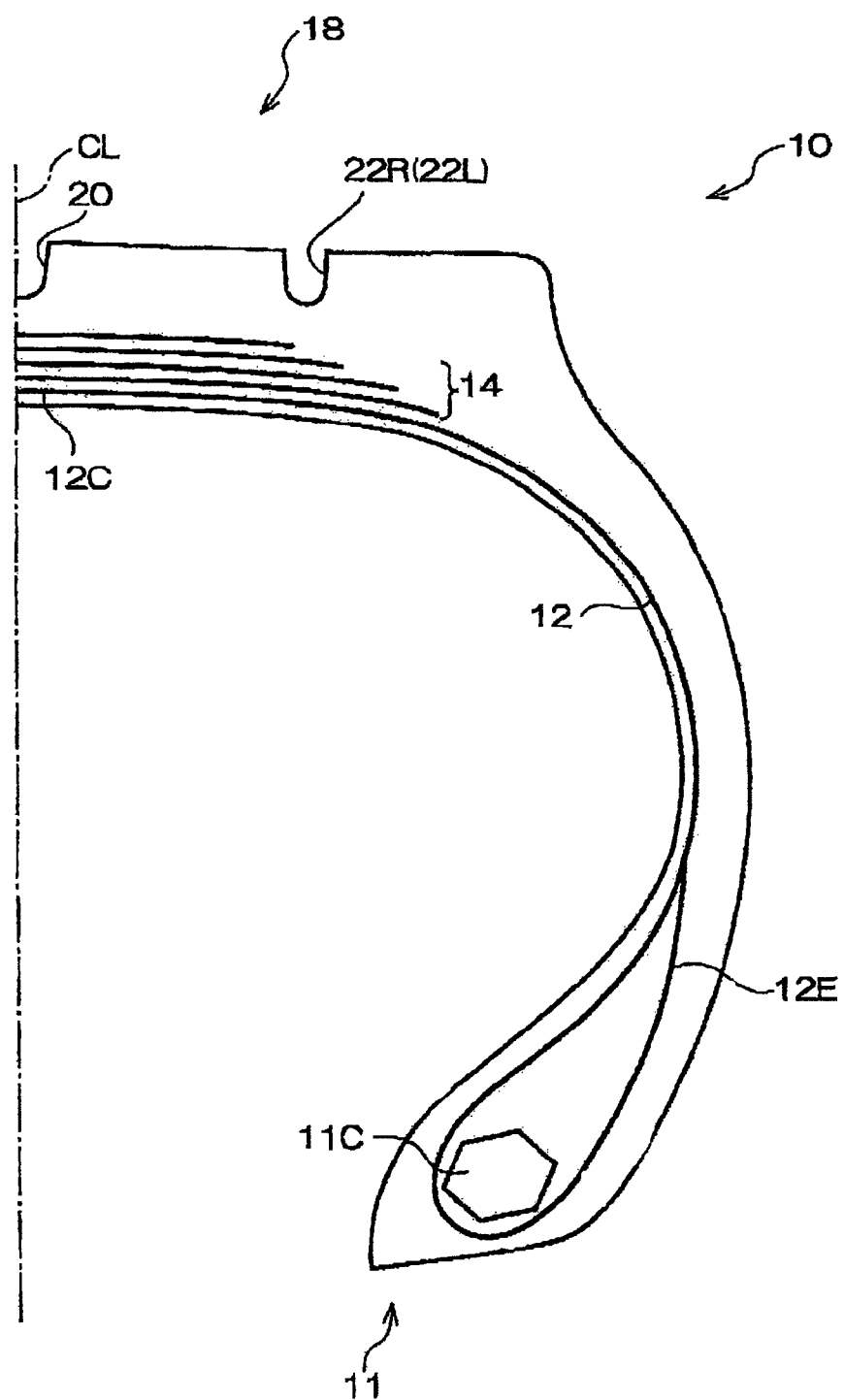
FIG. 1 is a sectional view in the tire radial direction of a pneumatic tire according one embodiment of the present invention.

Hereinafter, embodiments of the present invention will be discussed. As shown in FIG. 1, a pneumatic tire 10 according one embodiment of the present invention is a tire for truck and bus and has a carcass 12. The carcass 12 has turn-up portions 12E formed by turning up both end portions around bead core 11C of bead portions 11.

Belts 14 are embedded radially outside of a crown portion 12C of the carcass 12. A tread portion 18 (see also FIG. 2) provided with grooves is arranged radially outside of the belts 14.

Figure 2:
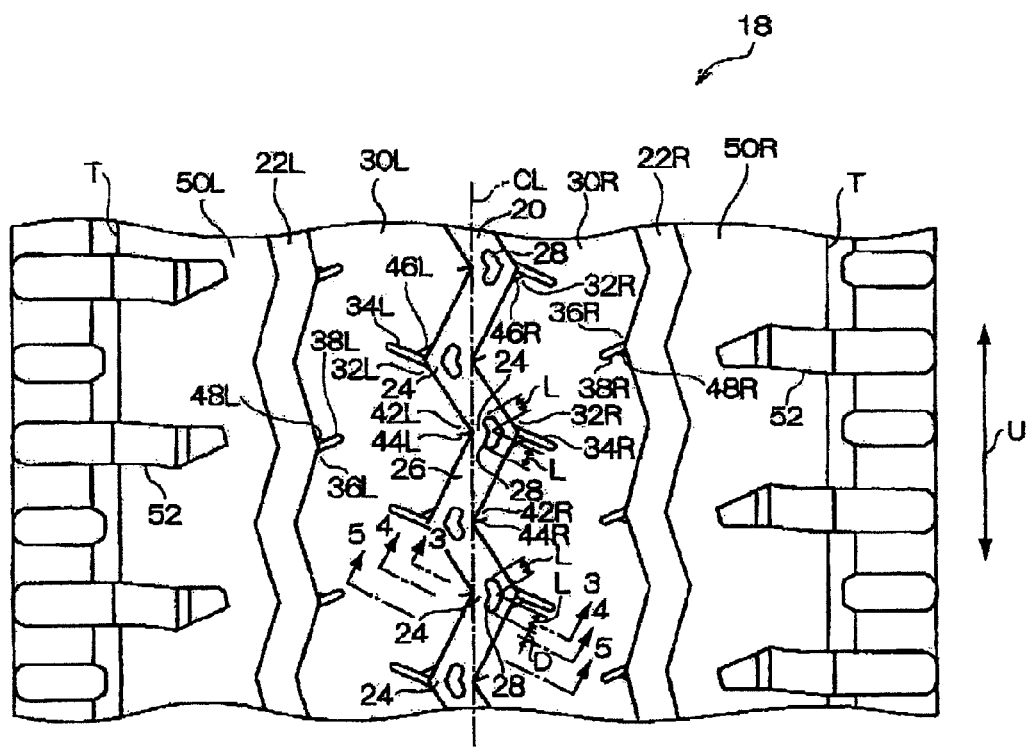
FIG. 2 is a developed plane view showing a tread pattern of a pneumatic tire according to one embodiment of the present invention.

As shown in FIG. 2, formed on the tread portion 18 are a center main groove 20 extending on the tire equator plane CL along the tire circumference direction U in a zigzag shape, shoulder main grooves 22L, 22R arranged in both side in the tire width direction and extending along the tire circumferential direction U in a zigzag shape, which forms so-called a "rib and lug pattern" as a tread pattern of the tire. These three main grooves define four land portion rows, i.e., inner land portion rows 30L, 30R and outer land portion rows 50L, 50R on the tread portion 18.

In the inner land portion row 30L, there are formed inner lug grooves 34L which extend from bent concave portions 32L in the center main groove side formed by the center main groove 20 and which terminate within the land portion row and outer lug groove 38L which extend from bent concave portions 36L in the shoulder main groove side formed by the shoulder main groove 22L and which terminate within the land portion. Likewise, in the inner land portion row 30R, there are formed inner lug grooves 34R which extend from bent concave portions 32R in the center main groove side formed by the center main groove 20 and which terminate within the land portion row and outer lug groove 38R which extend from bent concave portions 36R in the shoulder main groove side formed by the shoulder main groove 22R and which terminate within the land portion.

Further, in the inner land portion row 30L, there are formed inner first sipes 44L which extend from bent convex portions 42L in the center main groove side formed by the center main groove 20 and which terminate within the land portion row; inner second sipes 46L which extend from near bent concave portion 32L in the center main groove and which terminate within the land portion; and outer sipes 48L which extend from the bent concave portion 36L and terminate within the land portion. Likewise, in the inner land portion row 30R, there are formed inner first sipes 44R which extend from bent convex portions 42R in the center main groove side formed by the center main groove 20 and which terminate within the land portion row; inner second sipes 46R which extend from near bent concave portion 32R in the center main groove and which terminate within the land portion; and outer sipes 48R which extend from the bent concave portion 36R and terminate within the land portion.

A plurality of lug grooves 52 crossing the tire circumference direction U are formed in the outer land portion rows 50L, 50R. A widthwise outer end portion of each lug groove 52 extends beyond the tread end T to be able to drain water to the outer side in the tire width direction. In this specification, the term "tread end" refers to an outermost part of a ground contacting area in the tire width direction under a condition where a pneumatic tire is mounted on a standard rim specified in JATMA YEAR BOOK (2006 Edition, Japan Automobile Tire Manufacturers Association Standards), 100% of air pressure (maximum air pressure) corresponding to the maximum load capacity at applied size and ply rating defined in JATMA YEAR BOOK (load indicated in bold characters in the internal pressure-load capacity correspondence table) is filled as internal pressure, and then the maximum load capacity is applied. It is noted that where the TRA standard or the ETRTO standard is effective in the place of use or manufacturing, the above-mentioned definition follows such standard.

The center main groove 20 consists of flexion portions (bending portions) 24 bending in a zigzag shape and linear main groove portions (hereinafter referred to as linear portions) 26 connecting flexion portions adjacent in the tire circumference direction U. In this embodiment, the projections for preventing stone trapping (stone ejectors) 28 are disposed only on the groove bottoms of the flexion portions 24. This can significantly reduce the number of projections for preventing stone trapping to be disposed as compared with the conventional tire to thereby remarkably decrease likelihood of appearing the projections for preventing stone trapping on the tire surface while the tire is still usable.

Furthermore, in this embodiment, the projections preventing stone trapping are disposed only on the flexion portions 24 of the center groove 20 where stone trapping most likely occurs to ensure the durability of the center groove 20, but not disposed in the shoulder main grooves 22L, 22R. Thus, the tire can have a configuration in which the number of projection 28 for preventing stone trapping to be arranged is minimized, so that there is remarkably decreased likelihood of appearing the projection for preventing stone trapping on the tire surface while the tire is still usable. This does not give the user an impression of early worn-out and can improve the user's impression that the tire is completely used.

Figure 3:
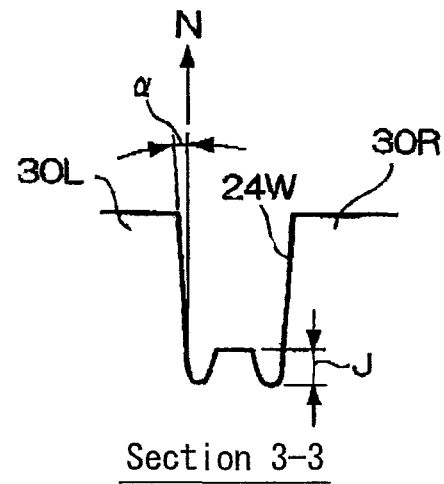
FIG. 3 is a sectional view taken along the arrow 3-3 of FIG. 2.

It is noted that the height J (see FIG. 3) of the projections 28 for preventing stone trapping in this embodiment is within a range of 5% to 50% of the groove depth of the center groove 20. Due to this, a stone is difficult to be trapped between the wall surface (groove wall 24W in FIG. 3) and the projection 28 for preventing stone trapping.

Figure 4:
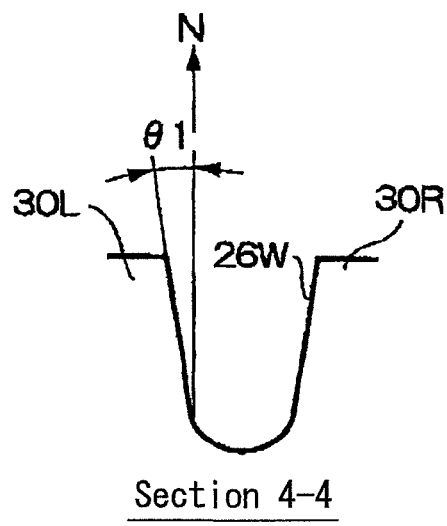
FIG. 4 is a sectional view taken along the arrow 4-4 of FIG. 2.
Figure 5:
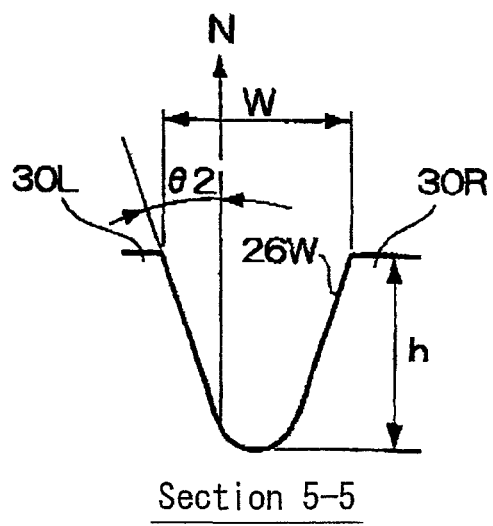
FIG. 5 is a sectional view taken along the arrow 5-5 of FIG. 2.

As shown in FIGS. 4 and 5, the groove wall angle θ (θ1 in FIGS. 4 and θ2 in FIG. 5) of the groove wall 26W of the linear portion 26 with respect to the tread normal line direction N gradually varies (fluctuate) within a range D of 2.0 mm from the end of the flexion portion 24 along the linear portion 26 (a section of a linear portion). That is, the angle θ gradually increase from the end of the flexion potion 24. This makes it difficult to cause stone trapping at the fluctuating section of the linear portion and its neighbors. It is noted that in this embodiment, the both ends of the projection 28 for preventing stone trapping are at the both end portions of the flexion portion 24, so the wall groove angle θ fluctuates within 2.0 mm from the end portion of the projection 28 for preventing stone trapping.

Further, the groove wall angle θ of the groove wall 26W of the linear portion 26 with respect to the tread normal line direction N is within a range of 15 degrees to 18 degrees, which is larger than the groove wall angle a of the groove wall 24W of the flexion portion 24 with respect to the tread normal line direction N. This enlarges the groove width of the linear portion 26 modestly to enable a further improvement of the stone-trapping resistance.

Meanwhile, the flexion portion 24 has a dogleg shape where stress tends to concentrate. The present embodiment, however, makes the groove wall angle θ of the groove wall 24W of the flexion portion 24 with respect to the tread normal line direction N smaller than the groove wall angle θ of the groove wall 26W of the linear portion 26 with respect to the tread normal line direction N, so that the radius of curvature of the groove bottom of the flexion portion 24 is not necessarily small even if the groove width of the flexion portion 24 is not widen. This gives the same level of crack resistance at the groove bottom of the flexion portion 24 as that of the conventional tire.

In addition, a ratio of the groove width W of the linear portion 26 on the tread surface to the groove depth h (W/h) is within a range of 0.8 to 1.2, which provide the linear portion 26 with a shape with less likelihood of stone trapping.

Both of the end portions of the projection 28 for preventing stone trapping are rounded with, for example, so-called single R to give a shape which hardly causes damage such as chipping.

Test Example 1

Test for Confirming an Effect on Wear Resistance

In order to confirm the result of the present invention, the present inventor prepared one example of the pneumatic tire 10 of the above embodiment (herein after referred to as Example Tire) and two examples of conventional pneumatic tire (hereinafter referred to as Conventional Tire 1 and Conventional Tire 2), and also measured the amount of ware during the field test for each tire to evaluate the stone-trapping resistance and tire operation life.

Figure 6:
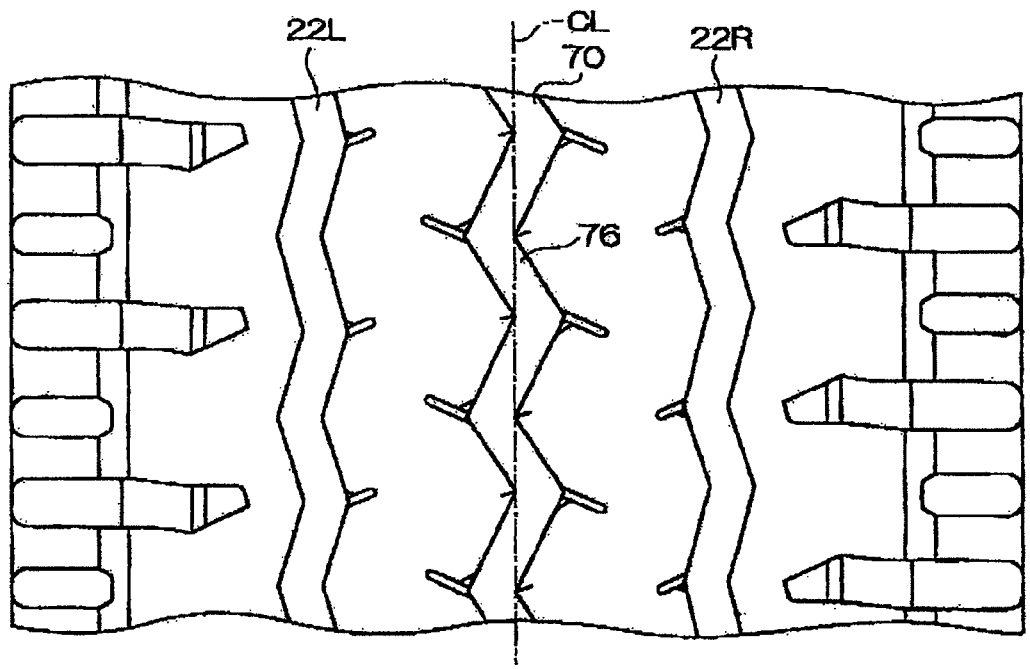
FIG. 6 is a plane view showing a tread pattern of one example of a conventional pneumatic tire.
Figure 7:
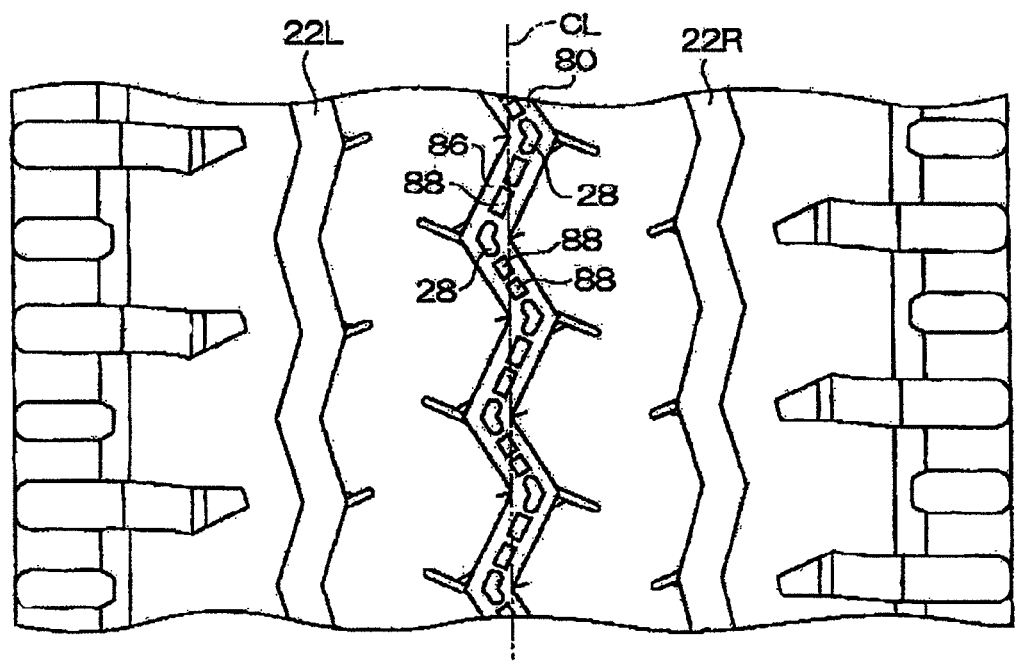
FIG. 7 is a plane view showing a tread pattern of another example of a conventional pneumatic tire.

In this test, Conventional Tire 1 had a center main groove 70 without a projection 28 for preventing stone trapping, and an angle of the groove wall (groove wall angle) of the linear portion 76 constituting the center main groove 70 with respect to the tread normal line direction smaller than that of Example Tire, as shown in FIG. 6. Conventional Tire 2 was similar to the pneumatic tire disclosed in Patent Document 1. It had projections 88 for preventing stone trapping in a linear portion which were arranged in a line along the linear portion 86 on the bottom portions of the linear portions 86 constituting the center main groove 80, and an angle of the groove wall (groove wall angle) of the linear portion 86 with respect to the tread normal line direction smaller than that of Example Tire, as shown in FIG. 7.

It is noted that in Example Tire, the projection 28 for preventing stone trapping had a shape bending along the flexion portion 24 and was sized to extend L=4 mm from the center of bending toward the respective end portions along the groove. As shown in FIG. 5, the groove shape of the linear portion 26 at the central portion in the longitudinal direction was such that groove depth h:groove width W equaled to 5:4 and W/h was 0.8, as shown in FIG. 5.

In this test, all the tire were for truck and bus and had a tire size of 11R22.5. In this test, each tire was mounted on a regular rim, and then installed on a drive shaft of a vehicle (2D4) with a regular load and a regular internal pressure being applied to. The term "regular rim" as used herein refers to a standard rim for an applied size specified in, for example, YEAR BOOK 2006 Edition published by JATMA, and the terms "regular load" and "regular internal pressure" refer to a maximum load capacity and an air pressure for this maximum load at applied size and ply rating defined in YEAR BOOK 2006 Edition published by JATMA as well.

Thereafter, the tires were driven on off roads and average numbers of stones trapped in the center main groove (average stone-trapping numbers) were measured for the tires installed on the F shaft.

In this test, the installation positions of the tires on the vehicle were fixed, but the tires were swapped between the test vehicles. The measurements were conducted every 15,000 km in total of five times. The results are shown in Table 1.

TABLE 1

|  | Measurement | | | | | Total number of stone trapping |
| --- | --- | --- | --- | --- | --- | --- |
|  | 1 | 2 | 3 | 4 | 5 |  |
| Conventional Tire 1 | 15 | 11 | 9 | 6 | 3 | 44 |
| Conventional Tire 2 | 0 | 0 | 0 | 0 | 0 | 0 |
| Example Tire | 0 | 1 | 1 | 0 | 0 | 2 |

(Each measurement was done every 15,000 km)

As can be seen from Table 1, the total number of stone trapping over five measurements was 44 for Conventional Tire 1, and 0 for Conventional Tire 2. Meanwhile, the total number of stone trapping was 2 for Example Tire, which proves that Example Tire has the same level of stone-trapping resistance as that of Conventional Tire 2.

Test Example 2

The inventor also mounted each of Example Tire, Conventional Tire 1 and Conventional Tire 2 on a regular rim, and then installed it on a drive shaft of a vehicle (2D4) with a regular load and a regular internal pressure being applied to. Thereafter, the tire was practically used, and when the user judged the rubber portion of the tire equator plan CL as being completely worn out, the groove depth of the remaining shoulder main groove was measured. In this test again, the installation positions of the tires on the vehicle were fixed, but the tires were swapped between the test vehicles. Measurements were conducted five times and the averages of measured values were used as remaining groove depths. The remaining groove depths of the tires are shown in Table 2.

TABLE 2

|  | Remaining groove depth of shoulder main groove |
| --- | --- |
| Conventional Tire 1 | 2.1 mm |
| Conventional Tire 2 | 5.0 mm |
| Example Tire | 2.9 mm |

As can be seen from Table 2, the remaining groove depth of the shoulder main grooves 22L, 22R (see FIG. 6) was 2.1 mm in Conventional Tire 1, and the remaining groove depth of the shoulder main grooves 22L, 22R (see FIG. 7) was 5.0 mm in Conventional Tire 2. Meanwhile, the remaining groove depth of the shoulder main grooves 22L, 22R was 2.9 mm in Example Tire. Accordingly, Example Tire was used until the remaining groove depth became the same level as that of Conventional Tire 1, which proves that the operation life of Example Tire is much longer than that of Conventional Tire 2.

It is noted that the present embodiment arranges projections 28 for preventing stone trapping only in the flexion portions 24 of the center main groove 20, but the projections for preventing stone trapping may be arranged in the shoulder main grooves 22L, 22R and their groove wall angle may be adjusted as having been described for the center main groove 20.

Although the present invention has been described above with reference to a preferred embodiment, it is apparent that the embodiment is merely an example and various modifications may be made without departing from the gist of the invention. Needless to say, the scope of the present invention is not limited to the above-described embodiment.

The invention claimed is:

1. A pneumatic tire provided with a plurality of main grooves extending along a tire circumference direction in a zigzag manner on a tread portion, characterized in that projections for preventing stone trapping are disposed on a groove bottom only of a bending portion of at least a main groove closest to a tire equator plane where the main groove bends in a zigzag manner, and an angle of each groove wall of a main groove portion connecting the adjacent bending portions with respect to a tread normal line direction is larger than an angle of each groove wall of the bending portion with respect to the tread normal line direction.

2. The pneumatic tire according to claim 1, wherein the angle of the each groove wall of the main groove portion with respect to the tread normal line direction is within a range of 15 degrees to 20 degrees.

3. The pneumatic tire according to claim 2, wherein a ratio of a groove width W of the main groove portion on the tread surface to a groove depth h of the main groove portion (W/h) is within a range of 0.8 to 1.2.

4. The pneumatic tire according to claim 2, wherein the angle of the each groove wall of the main groove portion with respect to the tread normal line direction varies within a range of 2.0 mm from the bending portion along the main groove portion.

5. The pneumatic tire according to claim 1, wherein a ratio of a groove width W of the main groove portion on the tread surface to a groove depth h of the main groove portion (W/h) is within a range of 0.8 to 1.2.

6. The pneumatic tire according to claim 5, wherein the angle of the groove wall of the main groove portion with respect to the tread normal line direction varies within a range of 2.0 mm from the bending portion along the main groove portion.

7. The pneumatic tire according to claim 1, wherein the angle of the each groove wall of the main groove portion with respect to the tread normal line direction varies within a range of 2.0 mm from the bending portion along the main groove portion.

* * * * *